United States Patent
Hennebelle et al.

(10) Patent No.: US 9,777,794 B2
(45) Date of Patent: Oct. 3, 2017

(54) PENDULUM DAMPING DEVICE FOR A MOTOR VEHICLE TORQUE TRANSMISSION DEVICE

(71) Applicant: VALEO EMBRAYAGES, Amiens (FR)

(72) Inventors: Michael Hennebelle, Houdain (FR); Markus Riethmuller, Abbevile (FR)

(73) Assignee: Valeo Embrayages (FR)

( * ) Notice: Subject to any disclaimer, the term of this patent is extended or adjusted under 35 U.S.C. 154(b) by 149 days.

(21) Appl. No.: 14/961,180

(22) Filed: Dec. 7, 2015

(65) Prior Publication Data

US 2016/0160958 A1    Jun. 9, 2016

(30) Foreign Application Priority Data

Dec. 8, 2014    (FR) ..................... 14 62036

(51) Int. Cl.
| | | |
|---|---|---|
| *F16F 15/123* | (2006.01) | |
| *F16F 15/14* | (2006.01) | |
| *F16H 45/02* | (2006.01) | |

(52) U.S. Cl.
CPC ........ *F16F 15/12353* (2013.01); *F16F 15/14* (2013.01); *F16F 15/145* (2013.01); *F16H 45/02* (2013.01); *F16H 2045/0226* (2013.01); *F16H 2045/0263* (2013.01)

(58) Field of Classification Search
None
See application file for complete search history.

(56) References Cited

U.S. PATENT DOCUMENTS

| | | | | |
|---|---|---|---|---|
| 2008/0156608 A1* | 7/2008 | Kombowski | ....... | F16D 25/0638 192/48.1 |
| 2008/0308375 A1* | 12/2008 | Heeke | ................... | B60K 6/485 192/3.29 |

FOREIGN PATENT DOCUMENTS

| | | |
|---|---|---|
| DE | 19631989 | 9/1997 |
| DE | 102008059297 A1 | 6/2009 |
| DE | 102012220887 A1 | 6/2013 |
| DE | 102013214155 A1 | 2/2014 |
| DE | 102014213617 A1 * | 2/2015 |
| EP | 2667050 A1 | 11/2013 |
| WO | WO2011110168 | 9/2011 |

OTHER PUBLICATIONS

French Search Report for corresponding FR1462036.

\* cited by examiner

*Primary Examiner* — Colby M Hansen
(74) *Attorney, Agent, or Firm* — Berenato & White, LLC

(57) ABSTRACT

A pendulum damping device for a motor vehicle torque transmission device, having a support washer, a flyweight capable of being displaced with respect to the support washer in order to damp vibrations deriving from an engine of the vehicle, the flyweight exhibiting on a lateral terminal edge a receptacle receiving a limit stop. The limit stop comprises an insert intended to be fastened in the receptacle of the flyweight and delimiting a cavity having a bottom and a mouth opposite the bottom, and a stop body projecting outside the cavity through the mouth.
The invention also relates to a torque transmission device utilizing a pendulum damping device of this kind.

16 Claims, 3 Drawing Sheets

PENDULUM DAMPING DEVICE FOR A MOTOR VEHICLE TORQUE TRANSMISSION DEVICE

CROSS-REFERENCE TO RELATED APPLICATIONS AND CLAIM TO PRIORITY

This application claims priority to Patent Application No. 1462036 filed Dec. 8, 2014 in France, the disclosure of which is incorporated herein by reference and to which priority is claimed.

FIELD OF THE INVENTION

The invention relates to a pendulum damping device and to a motor vehicle torque transmission device having a damping device of this kind.

BACKGROUND OF THE INVENTION

In the automotive sector it is known to utilize vibration damping devices in torque transmission devices, in particular in order to limit the transmission of vibrations from a driving shaft, such as the crankshaft of an internal combustion engine, to a driven shaft such as the input shaft of a gearbox. Devices of this kind are utilized in particular in motor vehicle clutches.

Among these damping devices, a device comprising a disk supporting pendulums is known, for example, from the international application WO 2011/110168. The pendulums have two flyweights, each extending on a respective side of the disk, which are connected by a rivet maintaining a spacing between the two flyweights. The disk is fastened, for example, to the output hub of a clutch device. The operation of a damper of this kind is known.

Because of the movement of these pendulums, however, it can happen that two of them come into contact. The metallic noise that is then generated by the impact of the two pendulums is particularly unpleasant. In addition, such impacts can cause deterioration of the pendulums and thus a loss of effectiveness of the damping device or even failure thereof.

To solve this problem, WO 2011/110168 proposes to fasten limit stops, made of elastomers, at the ends of the flyweights constituting the pendulums.

However, although these stops made of elastomeric material do allow a reduction in the noise caused by impacts between the flyweights, these stops are particularly difficult to handle and to install in the flyweights. In addition, positional retention of this type of elastomer stop over the entire service life of the clutch is not ensured.

SUMMARY OF THE INVENTION

The object of the invention is to propose a limit stop for a pendulum damping device pendulum flyweight which does not exhibit the drawbacks of the existing art and which, in particular, is easier to install in the flyweights.

To achieve this object, the invention proposes a pendulum damping device for a motor vehicle torque transmission device, the pendulum damping device having:
  at least one support exhibiting an axis of revolution;
  at least one flyweight capable of being displaced with respect to the support in a plane perpendicular to the axis of revolution in order to damp vibrations deriving from an engine of the vehicle, the flyweight exhibiting on one of its lateral terminal edges a receptacle in which is received a limit stop comprising:
    an insert intended to be fastened in the corresponding receptacle of the flyweight and delimiting a cavity having a bottom and a mouth opposite the bottom; and
    a stop body fastened in the cavity and projecting outside the cavity through the mouth opposite the bottom.

Installation of the limit stops in the pendulum is thus, advantageously, implemented by handling the stop body via the insert that surrounds it. The insert imparts to the limit stop a stiffness that does not at all change its damping properties. This allows easier handling of the stop, and faster installation in the flyweights. Such installation can possibly be automated, for example with the aid of a robot, which is difficult to envisage with a limit stop according to the existing art.

In addition, installation of the limit stop in the receptacle is effected in a more precise manner thanks to the easier handling of the insert. This contributes, with the insert that is received in the receptacle, to better retention of the limit stop in its receptacle.

According to preferred embodiments the pendulum damping device can exhibit one or more of the following characteristics, taken alone or in combination:
  the stop body is made of elastomeric material;
  the stop body is made of plastic material;
  the receptacle of the flyweight compresses the insert of the limit stop;
  the cavity exhibits a cross-sectional constriction in the vicinity of its mouth;
  the cross-sectional constriction is constituted by a wall of the insert which delimits the cavity and extends, in section in a plane perpendicular to the axis of revolution, in the form of a circular arc over an angular sector greater than 180°;
  the insert is a metallic strip or one made of plastic material;
  the insert has at least one tab, preferably two, extending outside the cavity;
  the flyweight exhibits at least one indentation in the vicinity of the receptacle receiving the limit stop, each indentation receiving one tab of the insert;
  the insert is generally omega-shaped;
  the insert exhibits, on a surface delimiting the cavity, at least one protruding contour;
  the protruding contour has at least one among a peak and a rib;
  the insert exhibits, on a surface delimiting the cavity, at least one recessed contour, the insert being configured to compress the stop body;
  the recessed contour has at least one among a hole and a groove;
  the stop body is produced by molding; and
  the stop body is overmolded onto the insert.

According to another aspect, the invention proposes a motor vehicle torque transmission device having:
  a friction coupling washer;
  an engine flywheel;
  a pressure plate;
  a clutch mechanism configured to selectively engage the friction coupling washer between the engine flywheel and the pressure plate; and
  a pendulum damping device as described above in all its combinations, the support being rotationally integral with one among the engine flywheel, the pressure plate, and the friction coupling washer.

The pendulum damping device as described above in all its combinations can furthermore comprise at least one group of different elastic members, in particular of different lengths, installed between a torque input element and a torque output element and acting oppositely to the rotation of the torque input element and torque output element with respect to one another, the elastic members of each group being arranged in series by means of a phasing member in such a way that the elastic members of each group deform in phase with one another, one among the torque input element, the torque output element, and the phasing member being rotationally integral with the support.

In this context, the invention proposes a motor vehicle torque transmission device having:

a clutch, in particular a disk clutch;

means for coupling the clutch to a first shaft;

a bladed impeller wheel configured to hydrokinetically drive a bladed turbine wheel by means of a reactor;

means for coupling the bladed impeller wheel to said first shaft; and a pendulum damping device as described above, the clutch and the bladed turbine wheel being coupled to said torque input element.

BRIEF DESCRIPTION OF THE DRAWINGS

The invention will be better understood in light of the description that follows, which refers to the attached drawings in which.

DETAILED DESCRIPTION OF THE PREFERRED EMBODIMENT(S)

Figure 1:
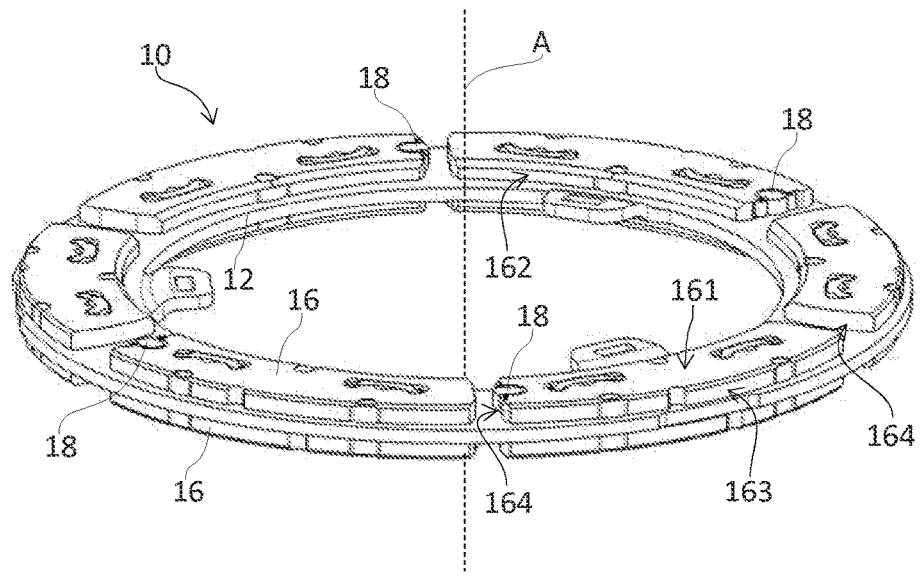
FIG. 1 schematically depicts a pendulum damping device for a motor vehicle torque transmission device.
Figure 2:
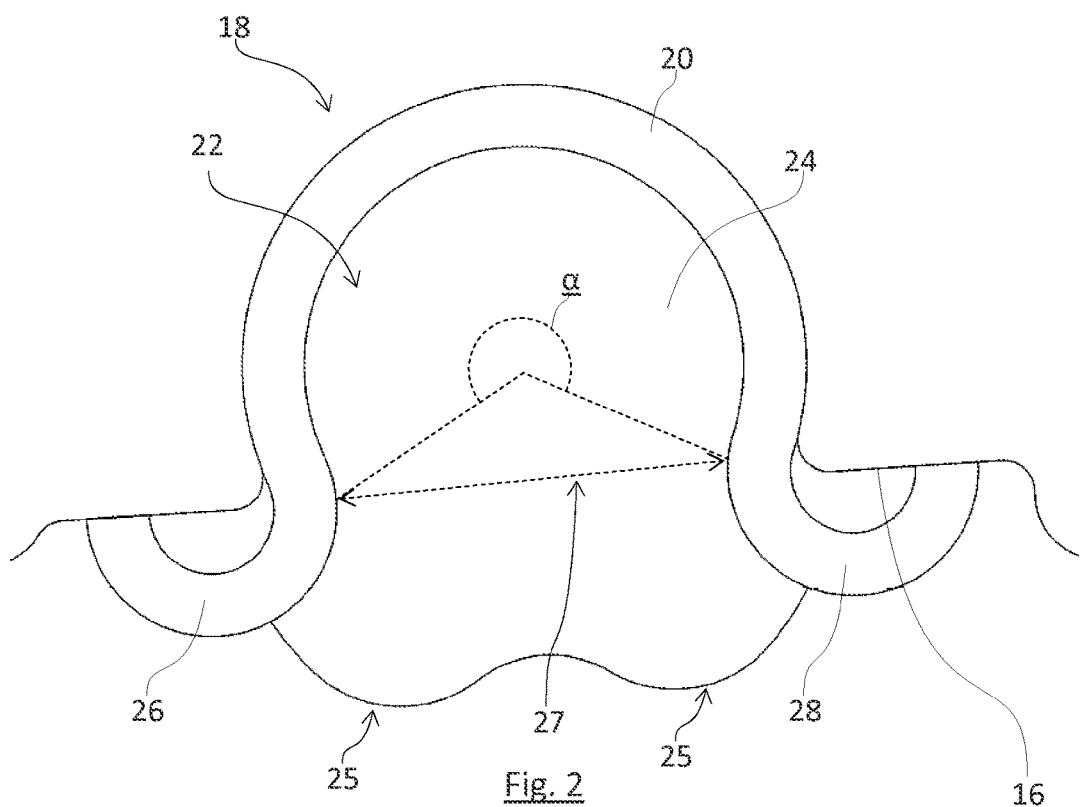
FIG. 2 schematically depicts an example of a stop configured to be utilized in the pendulum damping device of FIG. 1, and the corresponding stop insert.

In the description below, identical or identically functioning elements of the various embodiments carry the same reference character. In order to make the present description concise, these elements are not described with reference to each embodiment. Only the differences among the embodiments are described in detail.

FIG. 1 depicts a damping device 10 for a motor vehicle torque transmission device.

Damping device 10, as depicted in FIG. 1, firstly has a pendulum support 12, here in the shape of a ring, exhibiting an axis of revolution A. Pendulums 14 are installed on this pendulum support 12. Each pendulum 14 has a pair of flyweights 16, each extending respectively on one side of ring 12. Flyweights 16 of a pair of flyweights are interconnected via two bearing spacers, for example passing through two openings implemented in pendulum support 12, which allows pendulums 14 to oscillate by means of rollers in the event of abrupt changes in the torque to be transmitted in the torque transmission device, in particular via a centrifugal effect.

A damping device of this kind can be utilized in particular in a motor vehicle torque transmission device having a friction coupling washer, an engine flywheel, a pressure plate, and a clutch mechanism configured to selectively engage the friction coupling washer between the engine flywheel and the pressure plate, support 12 that supports the pendulum then being installed rotationally integrally with the engine flywheel, with the pressure plate, or with the friction coupling washer.

Each flyweight 16 has an inner face (not visible in the Figures) in contact with pendulum support 12, and an outer face 161 opposite the inner face. These two faces, the inner and outer 161, are ring-shaped in section. In other words, these faces, the inner and outer 161, extend principally in a plane perpendicular to axis of revolution A, substantially along a circular arc centered on axis of revolution A. Each flyweight 16 also has a radially inner edge 162 and a radially outer edge 163 that are opposite. These radially inner 162 and radially outer edges 163 also extend along circular arcs centered on axis of revolution A, over a thickness parallel to axis of revolution A. Lastly, each flyweight includes two lateral end edges 164 that extend principally in a radial direction with respect to axis of revolution A along a thickness parallel to axis of revolution A. These lateral end edges 164 thus on the one hand connect radially inner edge 161 and radially outer edge 162 to one another, and on the other hand connect the inner face and outer face 161.

In addition, as is evident from FIG. 1, at least one, preferably each, flyweight 16 has on a lateral end edge 164 a recessed receptacle receiving a limit stop 18, in such a way that a flyweight 16 cannot come into contact directly with an adjacent flyweight, said contact always being effected via limit stop 18.

Examples of limit stops 18 are depicted in FIGS. 2, 3a, 4a, and 5a. Limit stop 18 of FIG. 2 has essentially an insert 20 intended to be fastened in the corresponding receptacle of the flyweight. Preferably the receptacle in flyweight is defined so as to compress insert 20 of limit stop 18 when said insert is inserted into the receptacle. For example, the volume of the receptacle intended to receive flyweight 16 is less than the volume enclosed between the outer walls of insert 20. Here, for example, where insert 20 and the receptacle have circular cross sections, the radius of the outer wall of insert 20 is greater than the radius of the inner wall of the receptacle. Compression of insert 20 received in the receptacle allows the suppression of any axial movement, parallel to axis of revolution A, of limit stop 18 with respect to flyweight 16.

Figure 3A:
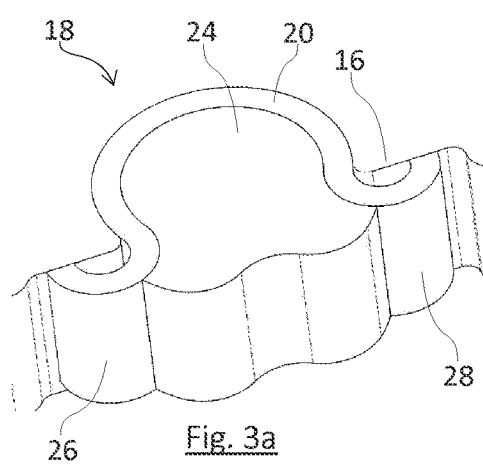
FIGS. 3a, 3b schematically depict an example of a stop configured to be utilized in the pendulum damping device of FIG. 1, and the corresponding stop insert in isolation.
Figure 3B:
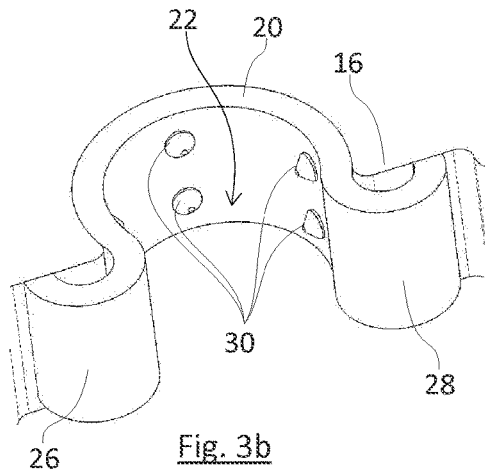
Figure 4A:
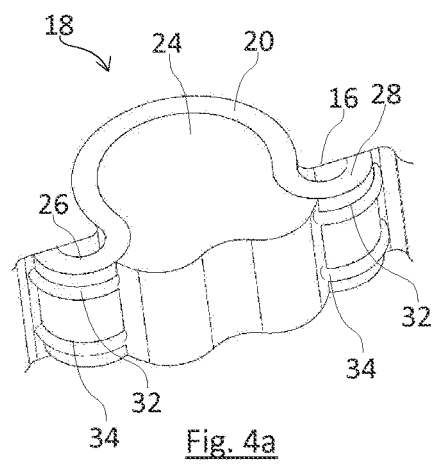
FIGS. 4a, 4b schematically depict another example of a stop configured to be utilized in the pendulum damping device of FIG. 1, and the corresponding stop insert in isolation.
Figure 4B:
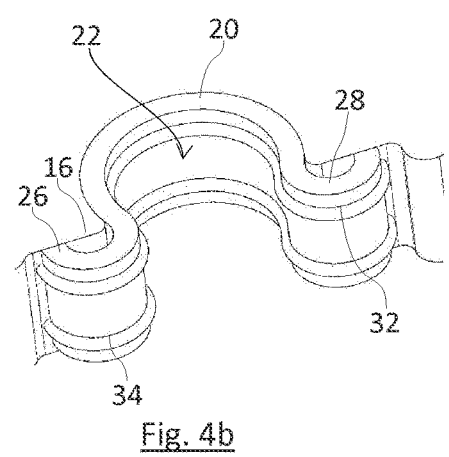
Figure 5A:
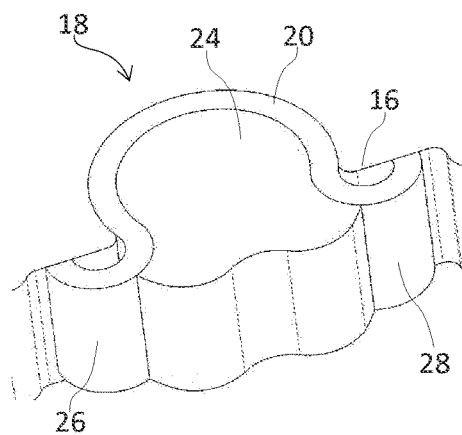
FIGS. 5a, 5b schematically depict yet another example of a stop configured to be utilized in the pendulum damping device of FIG. 1, and the corresponding stop insert in isolation.
Figure 5B:
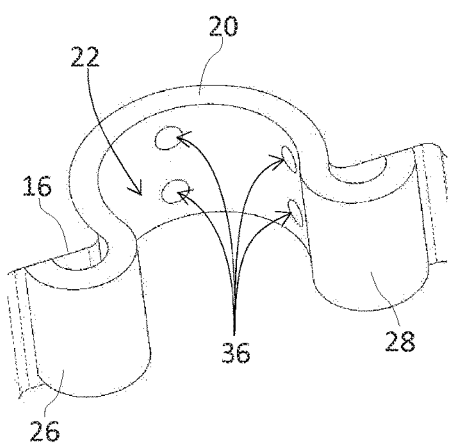

Insert 20 delimits a cavity 22 that is visible in FIGS. 3b, 4b, and 5b. Limit stop 18 likewise has a stop body 24, here made of elastomeric material, fastened in cavity 22 and projecting beyond the latter. The portion of stop body 24 projecting out with respect to cavity 22 has one, preferably two bosses 25, as depicted.

More specifically, insert 20 defines a cavity 22 having a bottom oriented toward the bottom of the receptacle in flyweight 16, stop body 24 projecting beyond cavity 22 in a direction opposite to the bottom of cavity 22. Stop body 24 thus allows flyweight-to-flyweight contact to be prevented by being interposed between two adjacent flyweights, thus limiting the noise that is generated and avoiding deterioration of the flyweights.

Stop body 24 is, for example, a part produced by molding. In this case stop body 24 can be added separately onto insert 20. Alternatively, the stop body is overmolded directly onto insert 20. In this case insert 20 is positioned in the molding die before the material of the stop body is injected.

The stop body can be made in particular of rubber or of an elastomeric material, for example of a fluoroelastomer such as Viton or of a nitrile rubber. The stop body can also be made of a plastic material. The stop body is produced from a material that exhibits compression properties and damping properties.

Insert 20 is produced here by means of a metal strip, but could also be made of plastic material. Strip 20 here is generally omega-shaped in a plane perpendicular to axis of revolution A. Specifically, insert 20 defines a cavity 22 having a passage constriction 27 in the vicinity of its mouth, contributing to positional retention of stop body 24 in insert 20. Here, therefore, insert 20 exhibits in cross section, perpendicularly to axis of revolution A, a portion in the shape of a circular arc, extending preferably over an angular sector a greater than 180°, to create passage constriction 27 in the vicinity of its mouth. A "circular angle sector a greater than 180°" is understood here to mean an angular sector corresponding to a center angle a greater than 180°.

Insert 20 also exhibits two tabs 26, 28 extending from the passage constriction beyond cavity 22. These tabs 26, 28 allow more effective fastening of limit stop 18 onto flyweights 16, which come into contact with the edge of the receptacle constituted in the flyweight that receives insert 20. The fastening of insert 20 is also facilitated by the curved shape of tabs 26, 28, such that only the end of these tabs comes into contact with flyweight 16. In addition, to ensure that these tabs 26, 28 do not come into contact with a flyweight 16 adjacent to flyweight 16 on which limit stop 18 is installed, the two tabs 26, 28 can be received in complementary indentations, provided for that purpose on flyweights 16, in the vicinity of the receptacle for receiving limit stop 18. In addition, stop body 24 can at least partially cover these tabs 26, 28. The boss or bosses 25 are also provided so as to project with respect to these tabs 26, 28.

As is evident from FIG. 3b, the surface of insert 20 delimiting cavity 22 can exhibit protruding contours 30, here in the form of cones or peaks. These cones 30 grip the elastomeric material of stop body 24, in particular when insert 20 is received in compressed fashion in the receptacle of the flyweight. This allows positional retention of stop body 24 with respect to insert 20 to be ensured.

As a variant, as illustrated in FIG. 4b, the surface of insert 20 delimiting cavity 22 exhibits two ribs 32, 34 extending parallel to one another over the entire length of the insert. These ribs 32, 34 are also intended to retain stop body 24 in position in cavity 22 by more significantly locally compressing the stop body in insert 20. This prevents, in particular, any displacement of stop body 24 in a direction perpendicular to axis of revolution A.

According to another variant evident from FIG. 5b, the surface of insert 20 delimiting cavity 22 exhibits at least one recessed contour, here in the form of holes 36, insert 20 being configured to compress stop body 24 in such a way that stop body 24 extends partially into holes 36 when limit stop 18 is received in the receptacle of flyweight 16. This or these recessed contours 36, for example four or six in number, likewise contribute to positional retention of stop body 24 with respect to insert 20. Other recessed contours on the surface of insert 20 delimiting cavity 22 can of course be imagined. In particular, one or more grooves can be implemented on that surface delimiting cavity 22.

The present invention is of course not limited to the description above. Numerous variant embodiments are accessible to one skilled in the art in the context of the invention defined by the attached set of claims.

For example, the flyweights can be interconnected by means of rivets, as described in the document WO 2011/110168.

According to another embodiment, the pendulum damping device can have two support washers connected to one another and a series of separate flyweights inserted axially between the two support washers, as described in the document DE19631989.

Figure 6:
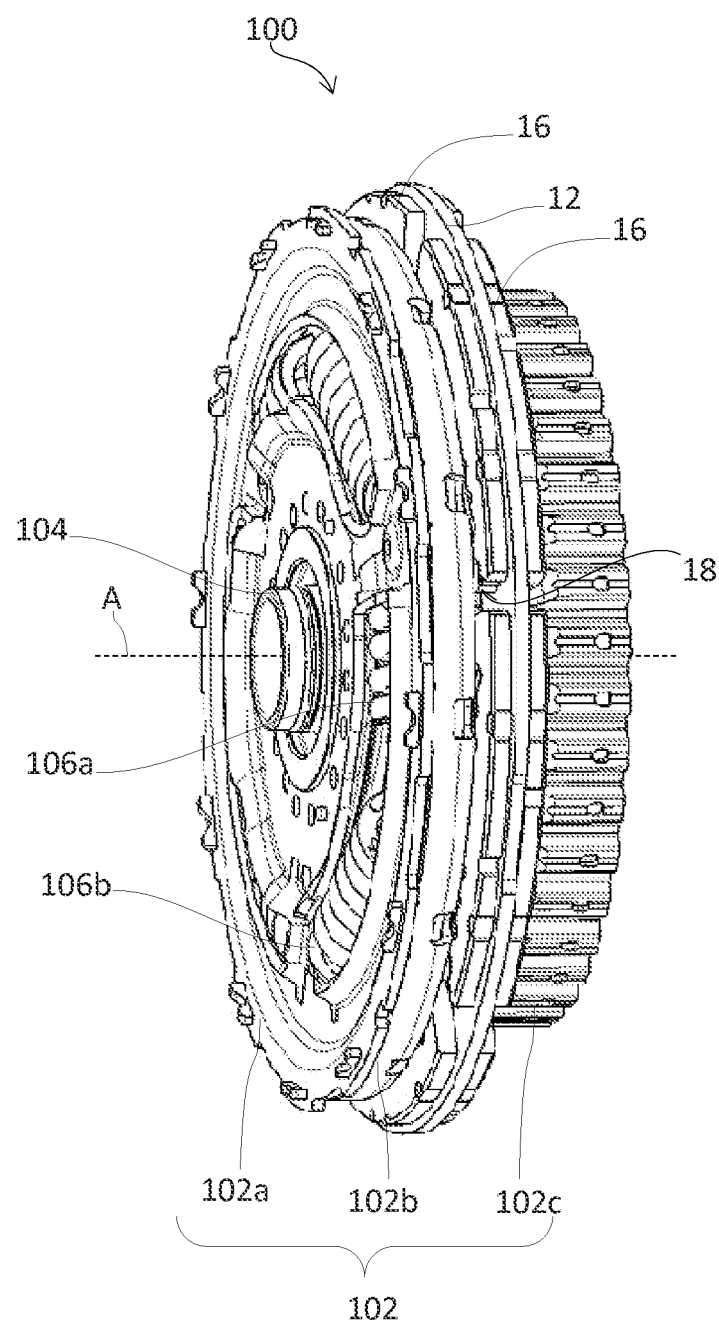
FIG. 6 schematically depicts another example of a pendulum damping device for a motor vehicle torque transmission device.

The pendulum damping device for a motor vehicle torque transmission device can furthermore be a long-travel damping device 100 or LTD. As illustrated in FIG. 6, in this case damping device 100 can have, in addition to damping pendulum support 12, a torque input element 102 and a torque output element 104, and at least one group of different elastic members 106a, 106b, in particular having different lengths, installed between torque input element 102 and torque output element 104 and acting oppositely to the rotation of torque input element 102 and torque output element 104 with respect to one another. Torque output element 104 is intended to be coupled to the input shaft of the gearbox. Elastic members 106a, 106b of each group are arranged in series by means of a phasing member, so that elastic members 106a, 106b of each group deform in phase with one another. The torque input element can have a first 102a and a second guide washer 102b that are rotationally integral and delimit receptacles to receive elastic members 106a, 106b. Elastic members 106a, 106b can be helical, in particular straight, springs. Each group of elastic members can have at least first and second straight helical springs, of identical diameter and pitch but of different lengths. Torque output member 104 can be, in particular, an annular web rotationally integral with a gearbox input shaft.

Torque input element 102 can also have a splined hub 102c fastened to one of the guide washers 102a, 102b, for example by means of rivets. Splined hub 102c is intended to be connected to an output shaft of a clutch, in particular of a disk clutch.

A motor vehicle torque transmission device utilizing an LTD can then have, besides torque damping device 100:
  a clutch, in particular a disk clutch;
  means for coupling the clutch to a first shaft;
  a bladed impeller wheel configured to hydrokinetically drive a bladed turbine wheel by means of a reactor;
  means for coupling the bladed impeller wheel to said first shaft;
  the clutch and the bladed turbine wheel being coupled to said torque input element.

A torque transmission device of this kind allows torque to be transmitted from an engine output shaft, conventionally the crankshaft, to a gearbox input shaft. The torque transmission device can utilize two parallel paths for this:

A first path, utilized upon initial movement of the motor vehicle, consists in utilizing the bladed impeller wheel capable of hydrokinetically driving the bladed turbine wheel by means of a reactor. The impeller wheel is coupled to the engine output shaft, and the turbine wheel is coupled to guide washers 102a, 102b of damping device 100. Damping device 100 thus allows the transmission of vibrations and noise from the engine output shaft to the gearbox input shaft to be limited. For this, the phasing member can be, for example, connected rotationally integrally to pendulum support 12.

Along a second path, the torque transmission device transmits torque from the engine output shaft to the gearbox input shaft through a so-called "lockup" clutch, the clutch being, for example, of the type having (a) disk(s). This second path is utilized subsequently to the first, in order to prevent undesirable slippage between the turbine wheel and impeller wheel in steady-state operation, i.e. after hydraulic coupling of the engine output shaft and the gearbox input shaft.

Certain aspects of the present invention have been explained with respect to specific embodiments. However, it will be apparent to one of ordinary skill in the art that various modifications and variations can be made in construction or configuration of the present invention without departing from the scope or spirit of the invention. Therefore, it is intended that the present invention cover all such modifications and variations, provided they come within the scope of the following claims and their equivalents.

The invention claimed is:

1. A pendulum damping device for a motor vehicle torque transmission device, the pendulum damping device having:
   at least one support (12) exhibiting an axis of revolution (A);
   at least one flyweight (16) capable of being displaced with respect to the support (12) in a plane perpendicular to the axis of revolution (A) in order to damp vibrations deriving from an engine of the vehicle, the flyweight (16) exhibiting on one of its lateral terminal edges a receptacle in which is received a limit stop (18) comprising:
      an insert (20) intended to be fastened in the corresponding receptacle of the flyweight (16) and delimiting a cavity (22) having a bottom and a mouth opposite the bottom; and
      a stop body (24) fastened in the cavity and projecting outside the cavity through the mouth opposite the bottom.

2. The damping device according to claim 1, in which the receptacle of the flyweight (16) compresses the insert (20) of the limit stop (18).

3. The damping device according to claim 2, in which the cavity (22) exhibits a cross-sectional constriction in the vicinity of its mouth.

4. The damping device according to claim 1, in which the cavity (22) exhibits a cross-sectional constriction in the vicinity of its mouth.

5. The damping device according to claim 4, in which the cross-sectional constriction is constituted by a wall of the insert (20) which delimits the cavity (22) and extends, in section in a plane perpendicular to the axis of revolution (A), in the form of a circular arc over an angular sector (a) greater than 180°.

6. The damping device according to claim 1, in which the insert (20) is a metallic strip or one made of plastic material.

7. The damping device according to claim 1, in which the insert (20) has at least one tab (26; 28), preferably two, extending outside the cavity (22).

8. The damping device according to claim 7, in which the flyweight (16) exhibits at least one indentation in the vicinity of the receptacle receiving the limit stop (18), each indentation receiving one tab (26; 28) of the insert (20).

9. The damping device according to claim 1, in which the insert (20) exhibits, on a surface delimiting the cavity, at least one protruding contour (30; 32).

10. The damping device according to claim 9, in which the protruding contour has at least one among a peak (30) and a rib (32).

11. The damping device according to claim 1, in which the insert (20) exhibits, on a surface delimiting the cavity (22), at least one recessed contour (36), the insert (20) being configured to compress the stop body (24).

12. The damping device according to claim 11, in which the recessed contour has at least one among a hole (36) and a groove.

13. The damping device according to claim 1, in which the stop body (24) is produced by molding, and the stop body (24) is overmolded onto the insert (20).

14. The pendulum damping device according to claim 1, furthermore comprising at least one group of different elastic members (106a, 106b), in particular of different lengths, installed between a torque input element (102) and a torque output element (104) and acting oppositely to the rotation of the torque input element (102) and torque output element (104) with respect to one another, the elastic members (106a, 106b) of each group being arranged in series by means of a phasing member in such a way that the elastic members (106a, 106b) of each group deform in phase with one another, one among the torque input element (102), the torque output element (104), and the phasing member being rotationally integral with the support (12).

15. A motor vehicle torque transmission device having:
   a clutch, in particular a disk clutch;
   means for coupling the clutch to a first shaft;
   a bladed impeller wheel configured to hydrokinetically drive a bladed turbine wheel by means of a reactor;
   means for coupling the bladed impeller wheel to said first shaft; and
   a pendulum damping device according to claim 14, the clutch and the bladed turbine wheel being coupled to said torque input element (102).

16. A motor vehicle torque transmission device having:
   a friction coupling washer;
   an engine flywheel;
   a pressure plate;
   a clutch mechanism configured to selectively engage the friction coupling washer between the engine flywheel and the pressure plate; and
   a pendulum damping device according to claim 1, the support (12) being rotationally integral with one among the engine flywheel, the pressure plate, and the friction coupling washer.

* * * * *